United States Patent
Prabhakar et al.

(10) Patent No.: US 11,985,027 B2
(45) Date of Patent: May 14, 2024

(54) SYSTEMS AND METHODS FOR SEAMLESS FAILOVER IN BRANCH DEPLOYMENTS BY SUPERIMPOSING CLUSTERING SOLUTION ON VRRP

(71) Applicant: HEWLETT PACKARD ENTERPRISE DEVELOPMENT LP, Houston, TX (US)

(72) Inventors: Raghunandan Prabhakar, Bangalore (IN); Piyush Agarwal, Santa Clara, CA (US); Shravan Kumar Vuggrala, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/192,510

(22) Filed: Mar. 4, 2021

(65) Prior Publication Data

US 2022/0286350 A1    Sep. 8, 2022

(51) Int. Cl.
| | |
|---|---|
| *H04L 41/0654* | (2022.01) |
| *H04L 12/46* | (2006.01) |
| *H04L 12/66* | (2006.01) |
| *H04L 45/28* | (2022.01) |
| *H04L 45/586* | (2022.01) |
| *H04L 69/40* | (2022.01) |

(52) U.S. Cl.
CPC ...... *H04L 41/0654* (2013.01); *H04L 12/4641* (2013.01); *H04L 12/66* (2013.01); *H04L 45/28* (2013.01); *H04L 45/586* (2013.01); *H04L 69/40* (2013.01)

(58) Field of Classification Search
None
See application file for complete search history.

(56) References Cited

U.S. PATENT DOCUMENTS

| | | |
|---|---|---|
| 6,556,547 B1 | 4/2003 | Srikanth et al. |
| 9,049,106 B2 | 6/2015 | Regan et al. |
| 9,559,962 B2 | 1/2017 | Durrani et al. |
| 11,122,007 B2 | 9/2021 | Vadde Makkalla et al. |

(Continued)

FOREIGN PATENT DOCUMENTS

CN    100484034 C    4/2009

OTHER PUBLICATIONS

Author Unknown, User Roles and User-Based Tunneling, pp. 1-106, Feb. 2019.*

(Continued)

*Primary Examiner* — Christopher M Crutchfield
(74) *Attorney, Agent, or Firm* — Sheppard Mullin Richter & Hampton LLP

(57) ABSTRACT

Systems and methods are provided for providing a clustering solution and a Virtual Router Redundancy Protocol (VRRP) platform for a branch deployment of at least a first gateway and a second gateway. The VRRP platform can be associated with a VRRP Internet Protocol (IP) address and the first gateway configured as a VRRP master. A change in an operational status of the first gateway can be determined with the clustering solution. The second gateway can be caused to be configured, with the clustering solution, as a new VRRP master. Network traffic associated with the VRRP Internet Protocol (IP) address can be received. The second gateway can be caused to forward the network traffic.

20 Claims, 7 Drawing Sheets

(56) References Cited

U.S. PATENT DOCUMENTS

| | | | |
|---|---|---|---|
| 2004/0010583 A1* | 1/2004 | Yu | H04L 45/00 709/224 |
| 2006/0168192 A1* | 7/2006 | Sharma | G06F 11/2028 709/224 |
| 2008/0071890 A1 | 3/2008 | Meier et al. | |
| 2010/0271933 A1* | 10/2010 | Li | H04L 45/00 370/219 |
| 2014/0029618 A1* | 1/2014 | Janardhanan | H04L 45/586 370/392 |
| 2014/0169154 A1* | 6/2014 | Chen | H04L 45/586 370/219 |
| 2016/0013862 A1* | 1/2016 | Zhang | H04L 41/0695 398/25 |
| 2016/0080483 A1 | 3/2016 | Li et al. | |
| 2016/0124819 A1* | 5/2016 | Killadi | H04L 41/0668 714/4.12 |
| 2016/0248729 A1 | 8/2016 | Cui et al. | |
| 2021/0058284 A1* | 2/2021 | Chandramohan | H04L 41/0668 |

OTHER PUBLICATIONS

S. Nadas, Virtual Router Redundancy Protocol (VRRP) Version 3 for IPv4 and IPv6, pp. 1-40 (Year: 2010).*

C. Lee, S. Kim, H. Ruy, FDVRRP: Router implementation for fast detection and high availability in network failure cases, pp. 473-482, May 15, 2019.*

Author Unknown, High Availability Configuration Guide, 17.2.0, pp. 1-85, Nov. 2017.*

P. Borne, N. Palmer, J. Skrabala, Developing a Method for Measuring the Failover Times of First Hop Redundancy Within Video Networks, pp. 1-15 (Year: 2018).*

Hinden, Virtual Router Redundancy Protocol, pp. 1-27, Apr. 2004.*

A. Mohamed. "Current Trends in Using the Software-Defined WAN". Computer and Information Systems and Technologies, Kharkiv National University of Radio Electronics. Apr. 2019.

Cisco SD-WAN. Configuring VRRP. "https://sdwan-docs.cisco.com/Product_Documentation/Software_Features/SD-WAN_Release_16.3/02System_and_Interfaces/06Configuring_Network_Interfaces/Configuring_VRRP". pp. 1-6. Aug. 2017.

Juniper Networks, "Understanding and Implementing Higi Definition Videoconferencing," Dec. 2010, pp. 1-200, Retrieved from the Internet from Apr. 20, 2019 from URL:<juniper.net/assets/us/en/local/pdf/books/7100137-en.pdf>.

NE Routing and Forwarding, pp. 1-1, Retrieved from the Internet Apr. 20, 2019 from URL: <infocenter.alcatel-lucent.com/public/5620SAM120R7A/index.jsp?topic=%2FSAM_UG%2Fhtml%2Fsam_network.html>.

S. Nadas. RFC 5798. "Virtual Router Redundancy Protocol (VRRP) Version 3 for IPv4 and IPv6", pp. 1-401. Mar. 2010.

S. Pandita. "OpenFlow Based Load Balancing and Proposed Theory for Integration in VoIP Network". Purdue University Graduate School, pp. 1-63. Dec. 2013.

T. Taleb, A. Ksentini and P. A. Frangoudis, "Follow-Me Cloud: When Cloud Services Follow Mobile Users," in IEEE Transactions on Cloud Computing, vol. 7, No. 2, pp. 369-382, Apr. 1-Jun. 2019.

T. Taleb, A. Ksentini. "On Efficient Data Anchor Point Selection in Distributed Mobile Networks". 2013 IEEE International Conference on Communications (ICC). 6289-6293. (Year: 2013).

* cited by examiner

SYSTEMS AND METHODS FOR SEAMLESS FAILOVER IN BRANCH DEPLOYMENTS BY SUPERIMPOSING CLUSTERING SOLUTION ON VRRP

FIELD

Embodiments of the disclosure relate to improving the performance of a network, wired and wireless. More specifically, embodiments of the disclosure relate to ensuring wireless traffic continuity when a branch gateway forwarding a client's transmissions enters an inactive state.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
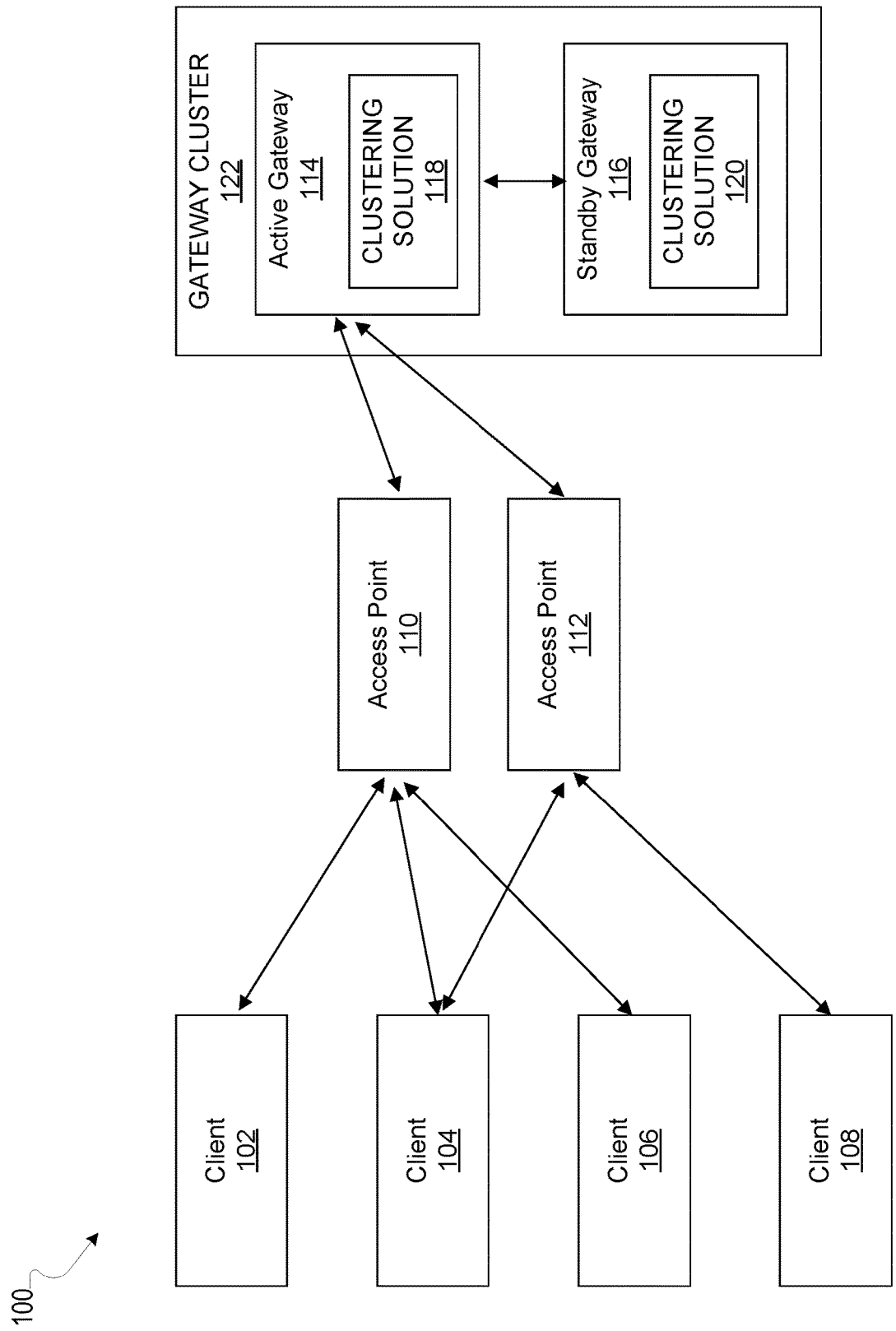
FIG. 1 is a block diagram of an exemplary network environment, according embodiments of the present disclosure.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Conventionally, branch deployments of two or more gateways can utilize the Virtual Router Redundancy Protocol (VRRP) to provide automatic assignment of available Internet Protocol (IP) routers to participating hosts, such as client devices. The VRRP is designed to increase availability and reliability of routing paths via automatic default gateway selections on an IP subnetwork.

The VRRP protocol achieves this by creation of virtual routers, which are an abstract representation of multiple routers (i.e. Primary/Active and Secondary/Standby routers) acting as a group. A virtual router implementing the VRRP protocol is assigned to act as a default gateway of participating hosts, instead of a physical router. If the physical router that is routing packets on behalf of the virtual router fails, another physical router is selected to automatically replace it. The physical router that is forwarding packets at any given time is called the Primary/Active router. The VRRP can be used in Ethernet, MPLS and Token Ring networks with Internet Protocol Version 4 (IPv4), as well as IPv6.

In the VRRP, a failure to receive a multicast packet (i.e., keep alive packet) from a Primary/Active router for a period longer than three times the advertisement timer causes Secondary/Standby routers to assume that the Primary/Active router is dead. An election process is initiated to select the next Primary/Active router from the Secondary/Standby routers. Generally, the advertisement timer may be defaulted to 1 second and the period for the failover may be 3 seconds.

The period for the failover can be unacceptably long for critical/time sensitive applications. Further, the VRRP does not share client sessions and states between gateways so that failover is not performed seamlessly (e.g., without undue delay in failover and/or without having to reauthenticate/reauthorize sessions and states). Accordingly, an improved failover mechanism beyond that provided by the VRRP is desired.

Branch deployments of gateways typically have two gateways which are layer-2 connected. Conventionally, VRRP provides access points with a virtual IP address of a default gateway. Clients connected to the access points can use the virtual IP address of the default gateway and the access points can direct client traffic to the virtual IP address. When a gateway configured as a VRRP master becomes inactive (e.g., device failure), a gateway that had been configured as a VRRP backup can forward client traffic in place of the gateway configured as the VRRP master. In the VRRP protocol, the failure of the VRRP master is detected by the VRRP backup based on failure to receive keep alive packets transmitted by the VRRP master to the VRRP backup. The failure detection takes time in the order of seconds (e.g., 3 seconds). The detection time can be unacceptable as the failover (e.g., switchover) between the VRRP master to the VRRP backup can undesirably impact time-sensitive client traffic. Further, the VRRP does not share client session information between the VRRP master and the VRRP backups and some critical client traffic (e.g., voice over internet protocol (VoIP)) can be lost during the failover. Accordingly, the VRRP alone does not adequately provide clients with a seamless failover.

An improved approach rooted in computer technology overcomes the foregoing and other disadvantages associated with conventional approaches specifically arising in the realm of computer technology. Based on computer technology, the disclosed technology can provide improved techniques of significantly reducing latency in the failover. Further, the disclosed technology can share client sessions and states between gateways such that no client traffic gets lost during the failover.

FIG. 1 is a block diagram 100 of an exemplary network environment, according to embodiments of the present disclosure. The block diagram 100 illustrates a flow of traffic between a plurality of client devices, access points, and gateways (e.g., branch gateways). The gateways 114, 116 can comprise a gateway cluster 122 within the communication network 100. According to the diagram of FIG. 1, both the access points 110, 112 can be within control scope of the gateway cluster 122.

The gateway cluster 122 can provide a redundant protocol (e.g., the VRRP) among its gateways 114, 116. The active gateway 114 can serve as the primary gateway for the access points 110, 112 and clients (e.g., client devices) 102, 104, 106, 108. The active gateway 114 can store client sessions and states. A standby gateway 116 serves as the backup gateway should the active gateway 114 become inactive. The standby gateway 116 can communicate with the active gateway 114 to store a backup copy of client sessions and states of the clients 102, 104, 106, 108. In the redundant protocol, the gateway cluster 122 can provide the access points 110, 112 and the clients 102, 104, 106, 108 with a single internet protocol (IP) address to communicate with the gateway cluster 122. While the active gateway 114 is operational, client traffic transmitted with the IP address will reach the active gateway 114. In case the active gateway 114 becomes inactive (e.g., malfunction, taken offline, placed in a suspended state, placed in a disabled state, or the like.), at least one of clustering solutions 118, 120 of the gateways 114, 116 can configure the standby gateway 116 to take over (e.g., failover or switchover) forwarding of client traffic previously forwarded by the active gateway 114. Further details regarding the failover will be provided with reference to FIG. 3 below.

Figure 2:
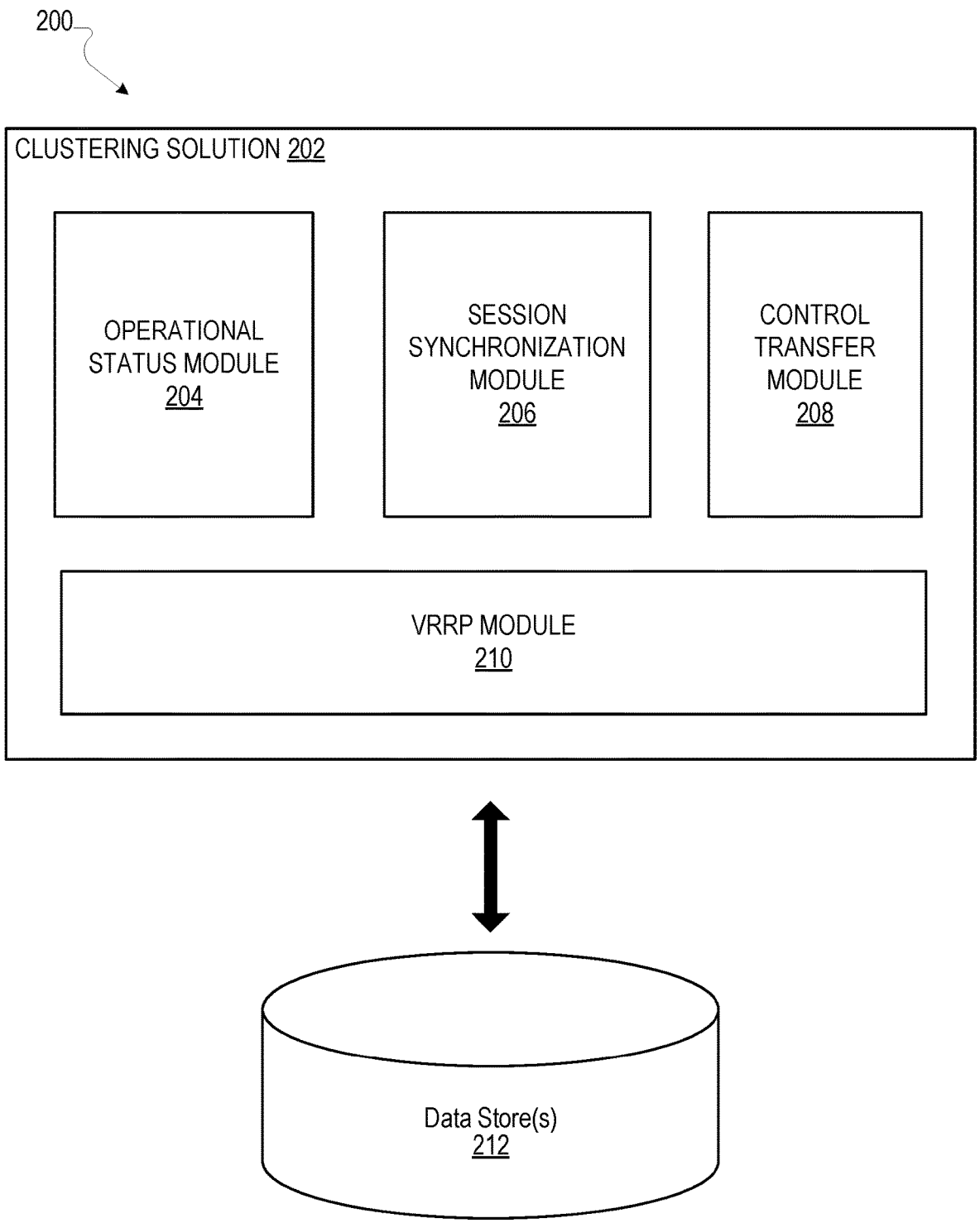
FIG. 2 is a block diagram of a clustering solution, according embodiments of the present disclosure.

FIG. 2 is a block diagram 200 of a clustering solution 202, according to embodiments of the present disclosure. The clustering solution 202 may be similar to clustering solution(s) 118, 120 in FIG. 1. The clustering solution 202 can include an operational status module 204, a session synchronization module 206, a control transfer module 208, and a VRRP module 210. The clustering solution 202 can provide various functions relating to providing seamless failover between two or more gateways. As one function, the clustering solution 202 can determine operational status of an active gateway (e.g., the active gateway 114 of FIG. 1) including whether the active gateway is operational or inactive. As another function, the clustering solution 202 can synchronize client session and states between the active gateway and a standby gateway (e.g., the standby gateway 116 of FIG. 1). As yet another function, the clustering solution 202 can transfer control (e.g., perform failover/switchover) to and from between the active gateway and the standby gateway. In some embodiments, the clustering solution 202 can utilize or otherwise be superimposed on an existing VRRP protocol through interactions with the VRRP module 210. In some embodiments, the clustering solution 202 can be implemented in each of the active gateway and the standby gateway to control operation of the gateways. Depending on whether a gateway is configured as an active gateway or a standby gateway, the clustering solution 202 executing in each gateway can perform different functions to communicate with one another to establish the seamless failover between the gateway. The modules in this figure and all figures herein are exemplary only, and other implementations may include additional, fewer, integrated or different components. Some modules may not be shown so as not to obscure relevant details.

In some embodiments, the various modules and/or applications described herein can be implemented, in part or in whole, as software, hardware, or any combination thereof. In general, a module and/or an application, as discussed herein, can be associated with software, hardware, or any combination thereof. In some implementations, one or more functions, tasks, and/or operations of modules and/or applications can be carried out or performed by software routines, software processes, hardware, and/or any combination thereof. In some cases, the various modules and/or applications described herein can be implemented, in part or in whole, as software running on one or more computing devices or systems, such as on a network computing device or on a server. For example, one or more modules and/or applications described herein, or at least a portion thereof, can be implemented as or within an application (e.g., app), a program, or an applet, etc., running on network computing device or system. The network computing device or system can be one or more hubs, repeaters, bridges, switches, routers, gateways, brouters, or the like. In another example, one or more modules and/or applications, or at least a portion thereof, can be implemented using one or more computing devices or systems that include one or more servers, such as network servers or cloud servers. It should be understood that there can be many variations or other possibilities.

The operational status module 204 can be configured to enable detection of an operational state of an active gateway (e.g., the active gateway 114 of FIG. 1). For the clustering solution 202 executing on an active gateway, the operational status module 204 can be configured to provide cluster heartbeats of the active gateway to a standby gateway (e.g., the standby gateway 116 of FIG. 1). A cluster heartbeat can be a signal or a data packet provided from a gateway (e.g., the active gateway 114 of FIG. 1) to other gateways (e.g., the standby gateway 116 of FIG. 1) that can inform operational status of the gateway to the other gateways. The operational status module 204 can provide the cluster heartbeats periodically, aperiodically, synchronously, or asynchronously. A rate of cluster heartbeats provided by the operational status module 204 can be substantially greater (e.g., more frequent) than a rate of keep alive packets provided according to conventional VRRP protocol. For example, the cluster heartbeats can be provided at intervals between 1-1000 milliseconds, which is substantially shorter compared to VRRP keep alive packets provided at 1 second intervals. The substantially greater rate of cluster heartbeats can ensure that other gateways can determine an operational status of a gateway in an expedited manner without having to wait an extended period of time for a failure to receive a keep alive packet from the gateway according to the conventional VRRP protocol.

For the clustering solution 202 executing on the standby gateway, the operational status module 204 can monitor the cluster heartbeats from the active gateway. When the operational status module 204 does not receive one or more cluster heartbeats from the active gateway, the operational status module 204 can determine that the active gateway is in an inactive state. The inactive state can be caused by variety of reasons, including the active gateway malfunction, taken offline, placed in a suspended state, placed in a disabled state, or the like. Upon determination of the inactive state of the active gateway, the standby gateway can notify the control transfer module 208 of a need to configure the standby gateway as a new VRRP master. More details on the operational status module 204 are provided with reference to FIG. 3 below.

The session synchronization module 206 can be configured to synchronize client sessions and states visible to one of the gateways to another gateway. For example, the session synchronization module 206 can synchronize client sessions and states of an active gateway (e.g., the active gateway 114 of FIG. 1) with a standby gateway (e.g., the standby gateway 116 of FIG. 1). Examples of sessions that may be opened and in use by a client (e.g., the client(s) 102, 104, 106, 108 of FIG. 1) include, but are not limited or restricted to, HTTP sessions, FTP sessions, Real-time Transport Protocol (RTP) sessions, Simple Mail Transfer Protocol (SMTP) sessions, Domain Name system (DNS) sessions, Transmission Control Protocol/Internet Protocol (TCP/IP) sessions, or the like.

Example of states that may be maintained for the standby gateway can include, for example, L2 and L3 user information, authentication/accounting keys, and IDs. Conventionally, the client may time-out of each of its client sessions and/or states, and the client sessions and/or states may be lost when the active gateway enters an inactive state. In such instances, conventional technologies such as the VRRP may cause some client traffic to be lost and, further, require the client to again undergo a re-authentication process. In contrast, the disclosed technology synchronizes such client sessions and states between the active gateway and the standby gateway such that the standby gateway can be aware of the client sessions and states. Accordingly, the standby gateway can seamlessly assume the role of the active gateway and client traffic.

For the clustering solution 202 executing on an active gateway, the session synchronization module 206 can be configured to provide client sessions and states of the active gateway to the standby gateway. For the clustering solution 202 executing on the standby gateway, the session synchronization module 206 can receive or monitor the client sessions and states from the active gateway and maintain the client sessions and states. In some embodiments, some or all of the client sessions and states can be synchronized between the two gateways. In some other embodiments, some of the client sessions and states can be selectively synchronized based on their importance or criticality.

The control transfer module 208 can be configured to transfer control from a gateway to another gateway. For example, the control transfer module 208 can transfer control from the active gateway to the standby gateway, and vice versa. In some embodiments, the control transfer module 208 can effectuate the transfer of control by driving VRRP states of the standby gateway. As mentioned with respect of the clustering solution 202, the clustering solution 202 can be superimposed over a conventional VRRP to supplement, replace, modify, or control some or all functions and features of the conventional VRRP. For example, the operational status module 204 of the clustering solution 202 can replace keep alive packets of the conventional VRRP with cluster heartbeats described above. As another example, the control transfer module 208 of the clustering solution can drive/modify VRRP states of the conventional VRRP. The control transfer module 208, by driving the VRRP states in response to a determination that the active gateway has become inactive, can cause the standby gateway to become a new VRRP master within a time frame of 1-1000 milliseconds. In some embodiments, the control transfer module 208 executing on the standby gateway can cause the standby gateway to become the new VRRP master.

The VRRP module 210 can be configured to provide some or all of functionalities of a conventional VRRP. The VRRP module 210 can be configured to execute on one or more gateways themselves. For example, an active gateway (e.g., the active gateway 114 of FIG. 1) can be configured as a VRRP master and a standby gateway (e.g., the standby gateway 116 of FIG. 1) can be configured as a VRRP backup. Further, the VRRP module 210 differentiates itself from the conventional VRRP in that VRRP states of its VRRP master and VRRP backup are driven by the clustering solution 202 that is superimposed on the VRRP module 210. In other words, the clustering solution 202 can effectuate configuration of a gateway as a VRRP master or a VRRP member.

As shown in FIG. 2, the clustering solution 202 can be configured to communicate with a data store 212. The data store 212 can be configured to store and maintain various types of data to support the functionality of the clustering solution 202. For example, the data store 212 can store and maintain timestamps associated with cluster heartbeats, operational status of gateways, client traffic, client sessions and states, VRRP states, or the like for the operational status module 204, session synchronization module 206, control transfer module 208, and VRRP module 210.

Figure 3:
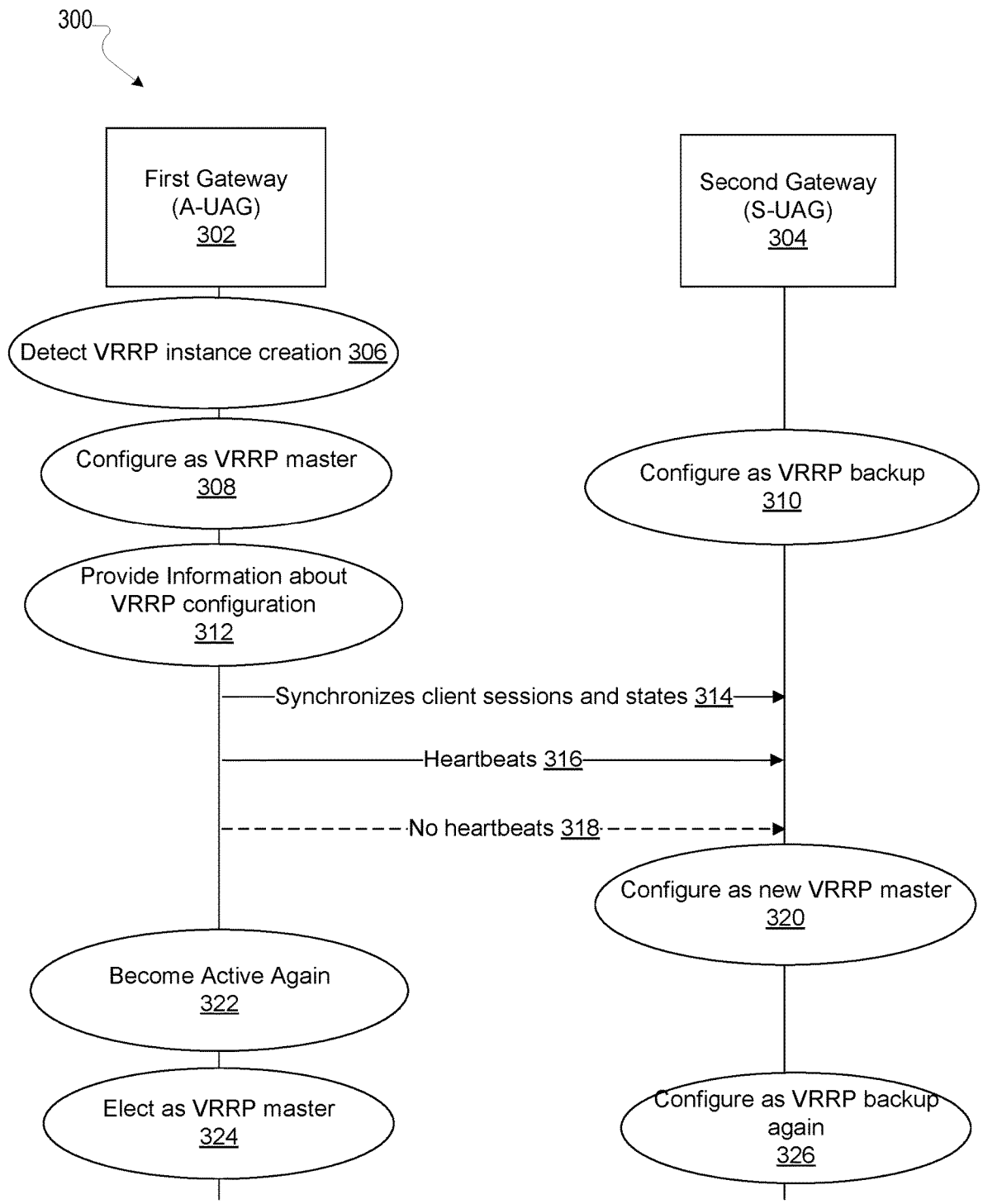
FIG. 3 is a sequence diagram illustrating exemplary network communication exchanges involved during failure detection of an active user-anchored gateway (A-UAG), according embodiments of the present disclosure.

FIG. 3 is a sequence diagram 300 illustrating exemplary network communication exchanges involved during failure detection of an active user-anchored gateway (A-UAG), according to embodiments of the present disclosure. A clustering solution (e.g., the clustering solution 202 of FIG. 2) can configure a first gateway 302 as a leader gateway. The first gateway 302 may be the same or similar to the active gateway 114 of FIG. 1. The clustering solution 202 can further configure a second gateway 304 as a member gateway of a gateway cluster (e.g., the gateway cluster 122 of FIG. 1). The second gateway 304 may be the same or similar to the standby gateway 116 of FIG. 1. The leader gateway (i.e., the first gateway 302) can publish a bucket map. The bucket map can be published to access points (e.g., the access points 110, 112 of FIG. 1) to direct client traffic to certain gateways. The bucket map can designate the first/leader gateway 302 as the A-UAG and the second/member gateway 304 as a standby user-anchored gateway (S-UAG) such that client traffic is directed to the first/leader gateway 302.

The cluster solution can listen for creation of an instance of VRRP 306 for virtual local area networks (VLANs). Upon detection of the creation, the cluster solution 202 can publish information with the first/leader gateway 302 configured as a VRRP master 308 and the second/member gateway 304 configured as a VRRP backup 310. Further, a VRRP internet protocol (IP) address can be configured to be always owned by the first/leader gateway 302. Information about VRRP configuration, including the VRRP IP address, can be provided to access points (e.g., the access points 110, 112 of FIG. 1) and client(s) (e.g., the client(s) 102, 104, 106, 108 of FIG. 1) to a gateway cluster (e.g., the gateway cluster 122 of FIG. 1). In some embodiments, the client(s) can get the VRRP IP address from a Dynamic Host Configuration Protocol (DHCP) server running on the first/leader gateway 302 or the second/member gateway 304. A default gateway can be associated with the VRRP IP, which can be always owned by the first/leader gateway 302.

The first/leader gateway 302 can synchronize client sessions and states 314 with the second/member gateway 304. Further, the second/member gateway 304 can receive heartbeats 316 of the first/leader gateway 302. During operation of the gateway cluster, the first/leader gateway 302 may become inactive and stop providing its heartbeats to the second/member gateway 304. When the second/member gateway 304 fails to receive heartbeats 318 of the first/leader gateway 302, the second/member gateway 304 can be configured as a new VRRP master 320. The process of detecting inactive operational status of the first/leader gateway 302 and configuring the second/member gateway 304 to forward client traffic can complete within a second. Further, as the client sessions and states are synched between the two gateways 302, 304, the failover/switchover can be seamless without any of the client(s) experiencing significant delay or loss of network traffic.

After a period of time, the first/leader gateway 302 may become active again 322. When the first/leader gateway 302 becomes active again, a cluster leader election algorithm can ensure that a gateway designated as the A-UAG is again configured as the VRRP master. Here, the first/leader gateway 302 is the A-UAG and, thus, the first/leader gateway 302 is elected as the VRRP master 324. Similarly, the second/member gateway 304 becomes the VRRP backup again 326. Future client traffic can be again received by the first/leader gateway 302.

Figure 4A:
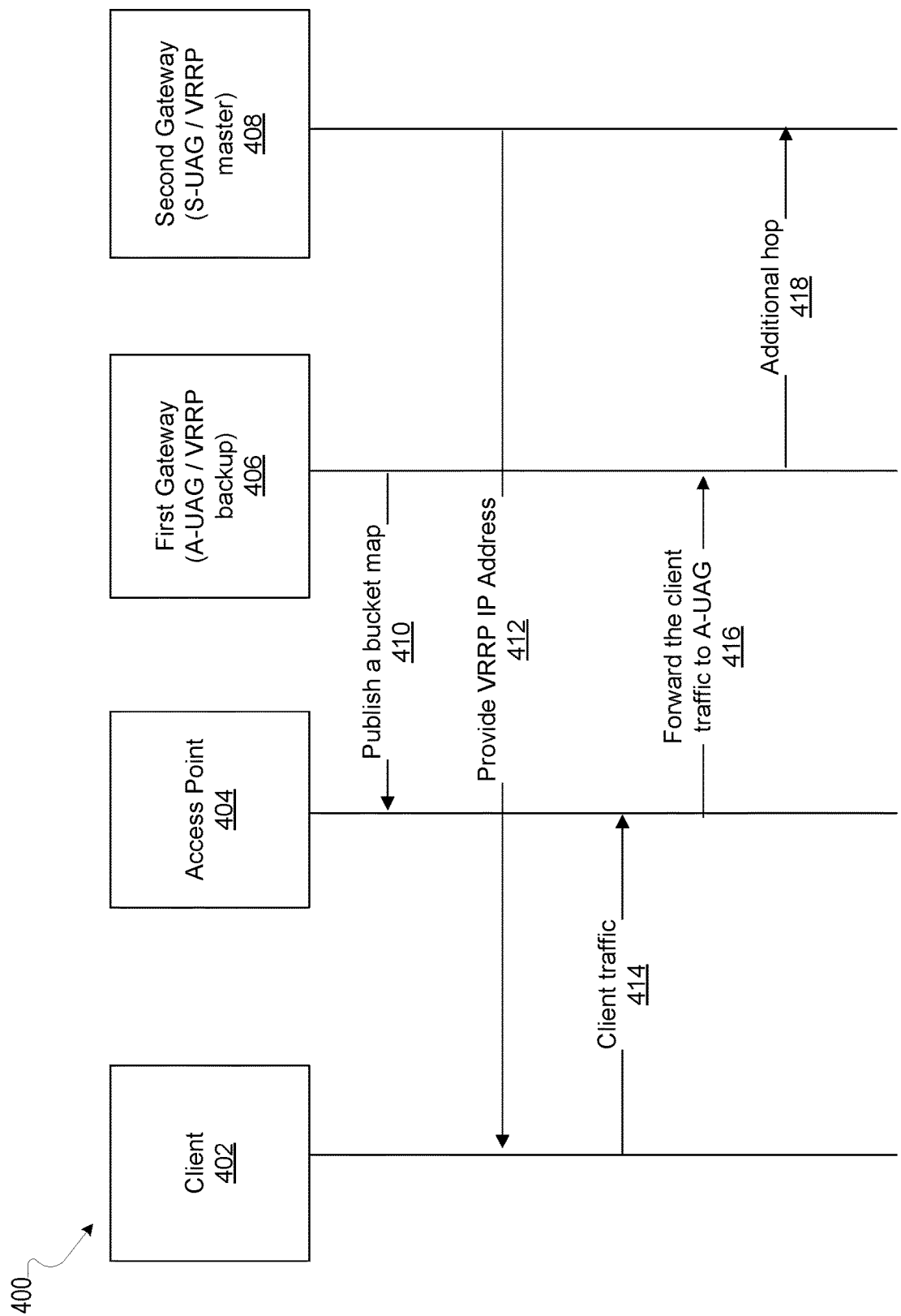
FIGS. 4A-4B are sequence diagrams illustrating exemplary network communication exchanges involved when an A-UAG and a VRRP master are, respectively, not identical and identical, according embodiments of the present disclosure.
Figure 4B:
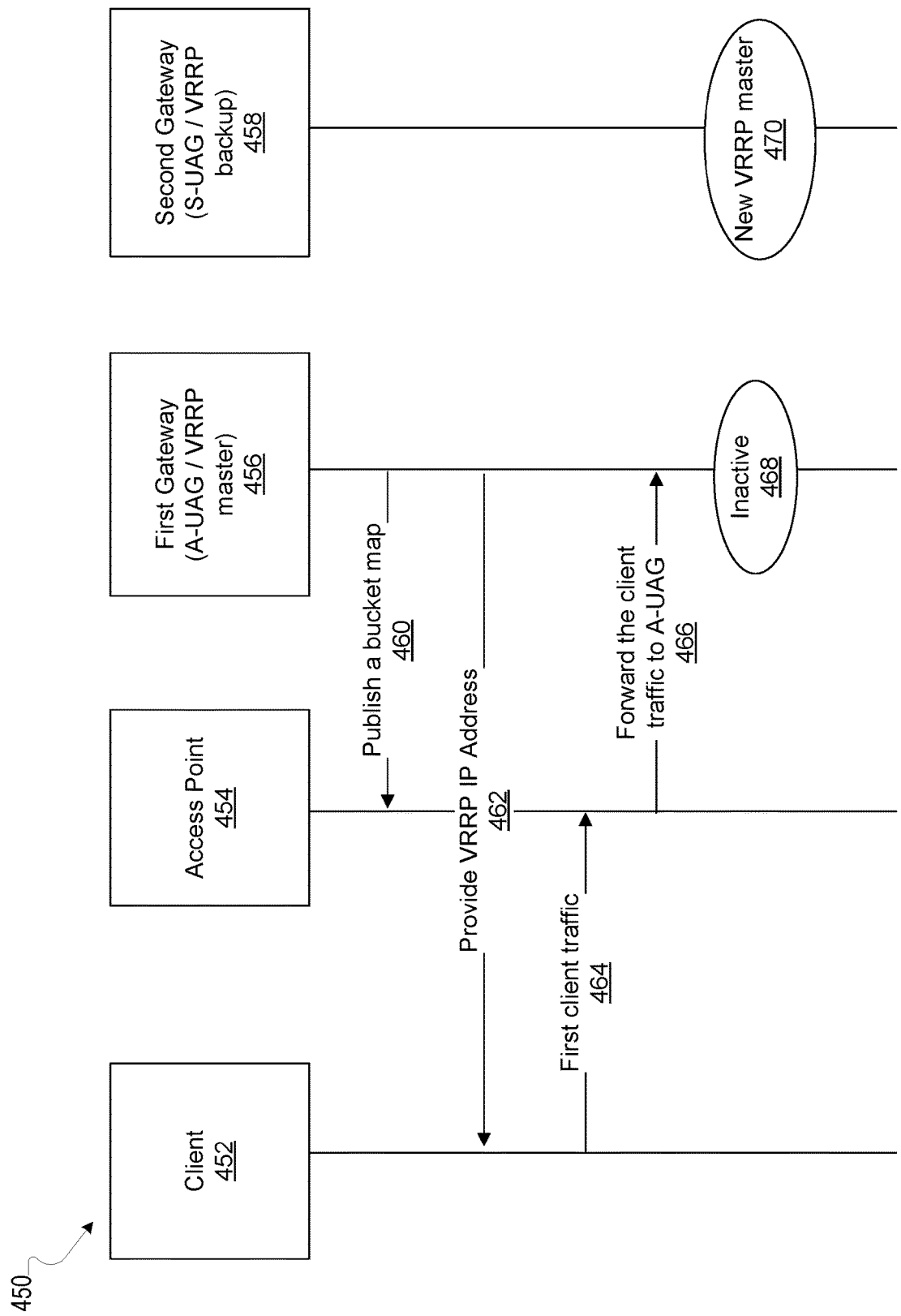

The configuration described in FIG. 3 can improve the forwarding of client traffic in an VRRP active-standby model by eliminating an unnecessary hop (e.g., east-west traffic). For example, where an A-UAG is not identical to a VRRP master, there can be an undesirable additional hop of received client traffic. FIGS. 4A-4B are sequence diagrams 400, 450 illustrating exemplary network communication exchanges involved when an A-UAG and a VRRP master are, respectively, not identical and identical, according to embodiments of the present disclosure.

FIG. 4A illustrates the undesirable additional hop when the A-UAG and the VRRP master are not identical. As described above with FIGS. 2 and 3, since a clustering solution (e.g., the clustering solution 202 of FIG. 2) can influence VRRP master election to be identical to the A-UAG, a scenario of FIG. 4A where VRRP master and A-UAG are not identical can be prevented. FIG. 4A is provided as a contrasting example to a scenario of FIG. 4B, where VRRP master and A-UAG are configured identical. In the sequence diagram 400, a first gateway 406 is configured as an the A-UAG and a VRRP backup. Further, a second gateway 408 is configured as an S-UAG and a VRRP master. In FIG. 4A, the first gateway 406 publishes a bucket map 410 to an access point 404 that directs client traffic to the first gateway 406. A DHCP server running on either the first gateway 406 or the second gateway 408 can provide to a client 402 a VRRP IP address.

The client 402 can use the VRRP IP address as a destination IP address to reach a gateway cluster (e.g., the gateway cluster 122 of FIG. 1). The client 402 provides client traffic 414 destined for the VRRP master to the access point 404. The access point 404 receives the client traffic and forwards the client traffic, based on the bucket map 410 that directs incoming client traffic to the A-UAG 406, to the first gateway 406 which is the VRRP backup. In the configuration of FIG. 4A, since the second gateway 408 is configured as the VRRP master, the first gateway 406 forwards the client traffic to the second gateway 408. This forwarding is an undesirable additional hop 418 of the client traffic. Thus, in the scenario of FIG. 4A, because the A-UAG and the VRRP master are not identical, the client traffic experiences the additional hop 418 to reach its default gateway (i.e., the second gateway 408) from the first gateway (i.e., A-UAG). The additional hop 418 can lead to increased latencies for time sensitive applications.

FIG. 4B illustrates removal of the undesirable additional hop by configuring the A-UAG and the VRRP master to be identical. In the sequence diagram 450, a first gateway 456 is configured as an the A-UAG and a VRRP master. Further, a second gateway 458 is configured as an S-UAG and a VRRP backup. In some embodiments, a cluster leader can publish a bucket map in such a way that all the buckets (e.g., indices associated with to which gateway to direct incoming client traffic) have the cluster leader as the A-UAG to ensure that all the client traffic reaches the cluster leader. For example, in FIG. 4B, the first gateway 456 is a cloud leader and configured as the A-UAG. At the same time, the cluster leader can also influence VRRP states of the first gateway 456 and the second gateway 458 to ensure that the cluster leader (i.e., the first gateway 456) is the VRRP master and the non-leader gateway (i.e., the second gateway 458) becomes the VRRP backup. A DHCP server running on either the first gateway 456 or the second gateway 458 can provide to a client 452 a VRRP IP address. The gateway cluster can be deployed in active-standby or one-to-one redundancy model.

The client 452 can use the VRRP IP address as a destination IP address to reach a gateway cluster (e.g., the gateway cluster 122 of FIG. 1). The client 452 provides client traffic 464 destined for the VRRP master to the access point 454. The access point 454 receives the client traffic and forwards the client traffic, based on the bucket map that directs incoming client traffic to the A-UAG 456, to the first gateway 456 which is the VRRP master. In the configuration of FIG. 4B, since the first gateway 456 is configured as the VRRP master in addition to its configuration as the A-UAG, the first gateway 456 does not need to forward the client traffic to the second gateway 458. Thus, the undesirable additional hop 418 of the scenario illustrated in FIG. 4A is removed in the scenario illustrated in FIG. 4B.

The second gateway 458 can detect that the first gateway 456 has become inactive 468 based on cluster heartbeats. Upon detection of such an event, the second gateway 458 can trigger client traffic switchover from the first gateway 456 to the second gateway 458 and become a new VRRP master 470. In some embodiments, the second gateway 458 (i.e., S-UAG) can trigger the client traffic switchover by sending a node list, a list of active nodes, to the access point 454. Since the node list does not contain the first gateway 456 (i.e., A-UAG), the access point 454 can determine that the A-UAG 456 is inactive. Then, the access point 454 can direct client traffic to be sent to the S-UAG 458 in the bucket map. Since client sessions are synced from the first gateway 456 to the second gateway 458, the switchover is seamless in the entire scenario.

When the first gateway 456 becomes operational again, a cluster leader election algorithm can ensure that the A-UAG election again influences re-election of the first gateway 456 as the VRRP master.

Figure 5:
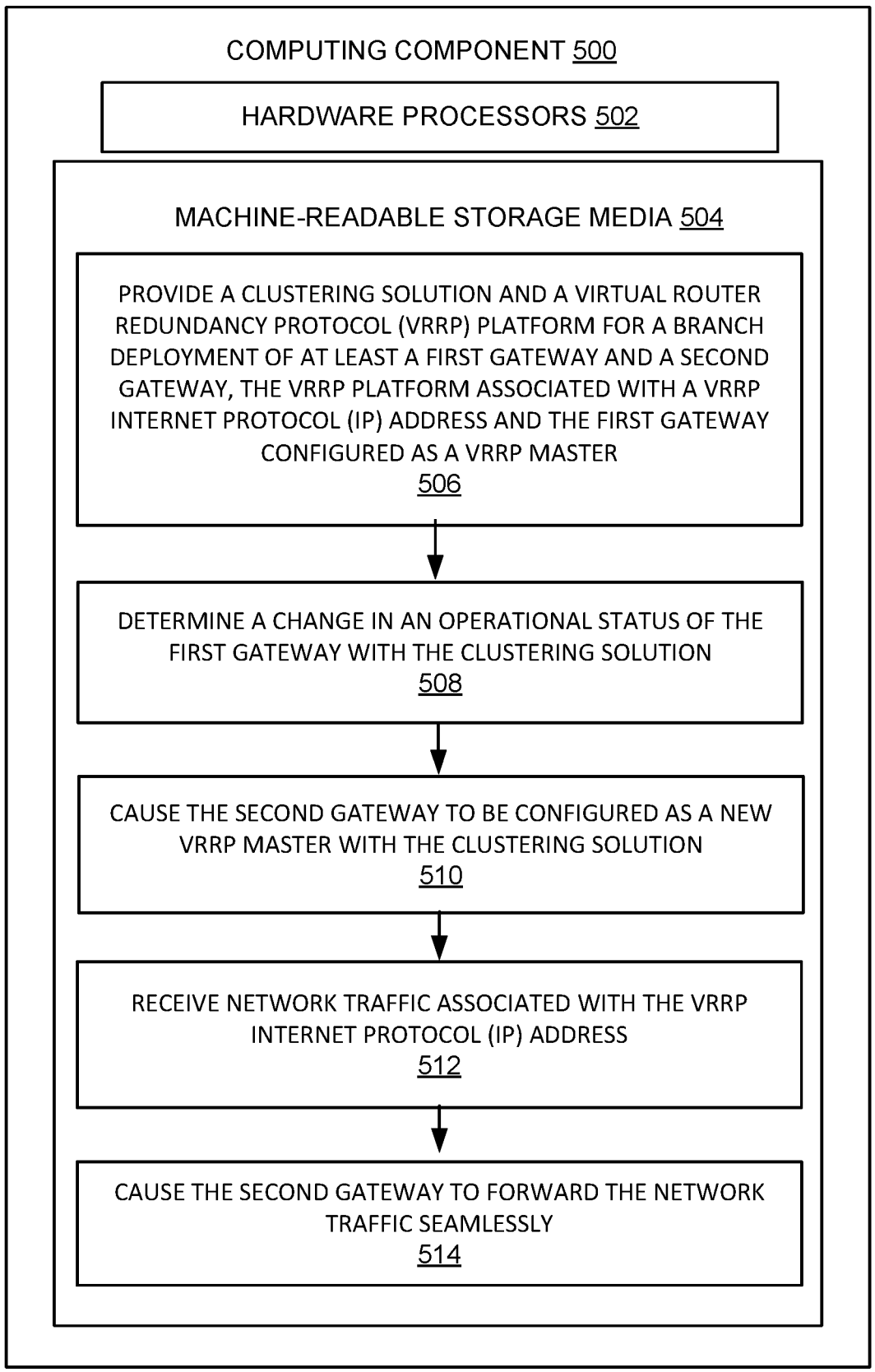
FIG. 5 depicts a set of executable instructions stored in machine-readable storage media that, when executed, cause one or more hardware processors to perform an illustrative method for providing seamless failover, according embodiments of the present disclosure.

FIG. 5 depicts a computing component 500 that includes one or more hardware processors 502 and machine-readable storage media 504 storing a set of machine-readable/machine-executable instructions that, when executed, cause the hardware processors 502 to perform an illustrative method for combining feature values according to example embodiments of the invention. The computing component 500 may be, for example, the computing system 600 depicted in FIG. 6 or another computing device described herein. The hardware processors 502 may include, for example, the processor(s) 604 depicted in FIG. 6 or any other processing unit described herein. The machine-readable storage media 504 may include the main memory 606, the read-only memory (ROM) 608, the storage 610, or any other suitable machine-readable storage media described herein.

At block 506, in example embodiments, instructions may be executed by the hardware processors 502 to provide a clustering solution and a Virtual Router Redundancy Protocol (VRRP) platform for a branch deployment of at least a first gateway and a second gateway. The VRRP platform can be associated with a VRRP Internet Protocol (IP) address and the first gateway configured as a VRRP master.

At block 508, in example embodiments, instructions may be executed by the hardware processors 502 to determine a change in an operational status of the first gateway with the clustering solution.

At block 510, in example embodiments, instructions may be executed by the hardware processors 502 to cause the second gateway to be configured as a new VRRP master with the clustering solution.

At block 512, in example embodiments, instructions may be executed by the hardware processors 502 to receive network traffic associated with the VRRP Internet Protocol (IP) address.

At block 514, in example embodiments, instructions may be executed by the hardware processors 502 to cause the second gateway to forward the network traffic.

Figure 6:
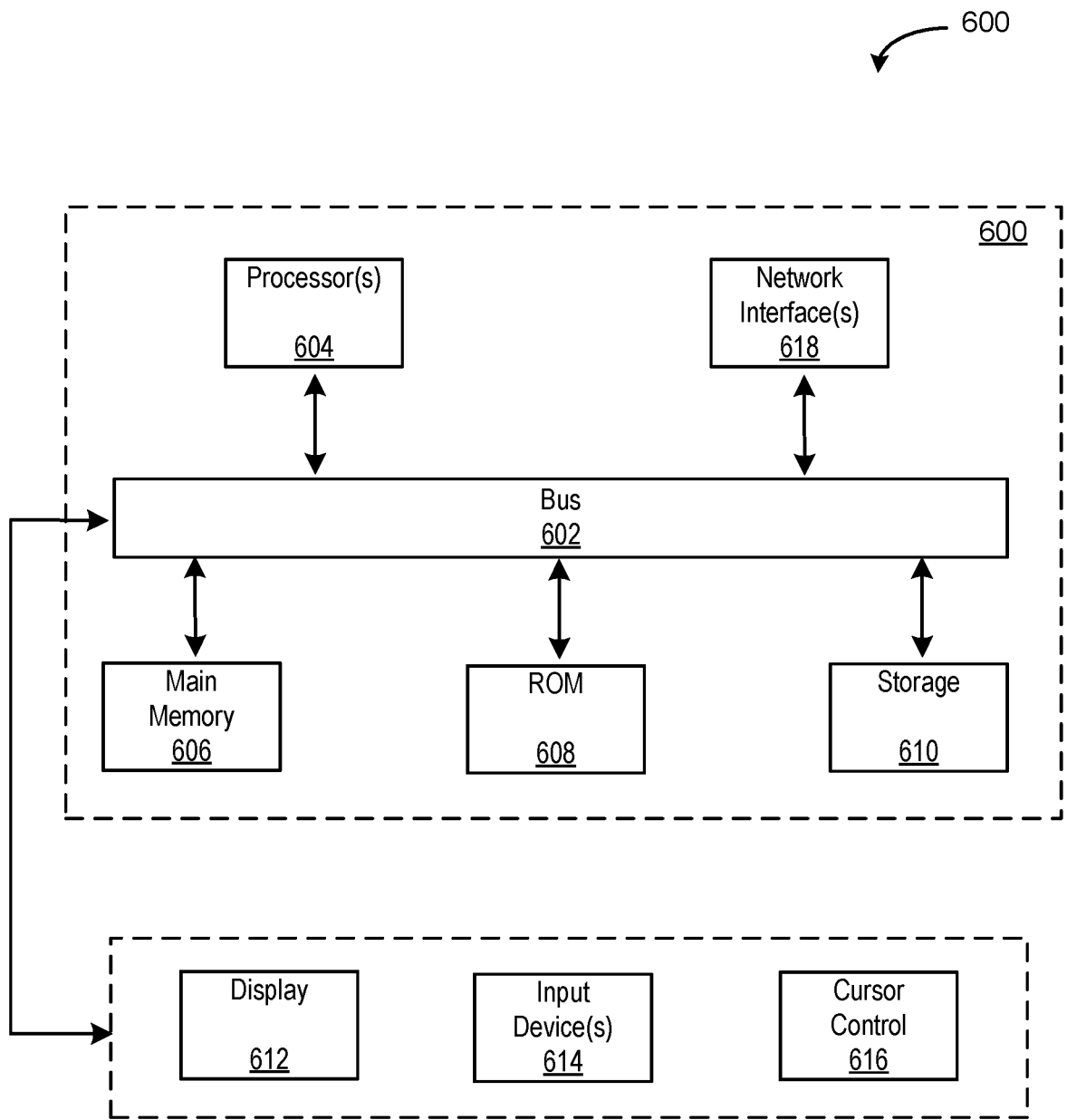
FIG. 6 is an example computing component that may be used to implement various features of embodiments described in the present disclosure.

FIG. 6 depicts a block diagram of an example computer system 600 in which various of the embodiments described herein may be implemented. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

The computer system 600 may be coupled via bus 602 to a display 612, such as a liquid crystal display (LCD) (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. In some embodiments, the same direction information and command selections as cursor control may be implemented via receiving touches on a touch screen without a cursor.

The computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

Any of the aforementioned engines or modules can be embodied as a computing component of the computing system 600. For example, the clustering solution 202, operational status module 204, session synchronization module 204, control transfer module 206, and VRRP module 210 of FIG. 2 can be embodied as a computing component of the computing system 600.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

The computer system 600 also includes a communication interface 618 coupled to bus 602. Network interface 618 provides a two-way data communication coupling to one or more network links that are connected to one or more local networks. For example, communication interface 618 may be an integrated services digital network (ISDN) card, cable modem, satellite modem, or a modem to provide a data communication connection to a corresponding type of telephone line. As another example, network interface 618 may be a local area network (LAN) card to provide a data communication connection to a compatible LAN (or WAN component to communicated with a WAN). Wireless links may also be implemented. In any such implementation, network interface 618 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 618, which carry the digital data to and from computer system 600, are example forms of transmission media.

The computer system 600 can send messages and receive data, including program code, through the network(s), network link and communication interface 618. In the Internet example, a server might transmit a requested code for an application program through the Internet, the ISP, the local network and the communication interface 618.

The received code may be executed by processor 604 as it is received, and/or stored in storage device 610, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 600.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

What is claimed is:

1. A method comprising:
   providing a cluster comprising a first gateway and a second gateway that employ a Virtual Router Redundancy Protocol (VRRP) and that are implemented on one or more computers, wherein the first gateway is initially a VRRP leader gateway and the second gateway is initially a VRRP standby gateway, and wherein the cluster comprising the first gateway and the second gateway is associated with a VRRP Internet Protocol (IP) address;
   receiving, by the second gateway from the first gateway, gateway state information of a gateway state of the first gateway and client session information of client sessions that use the VRRP IP address, thereby synchronizing the gateway state and the client sessions between the first and second gateways, the gateway state comprising authentication information;
   receiving, by the second gateway from the first gateway, a heartbeat message indicating whether the first gateway is operational, wherein the heartbeat message is distinct from a keep-alive message of the VRRP;

determining, by the second gateway, that the first gateway is in an inactive state based on missing a predetermined number of heartbeat messages from the first gateway;

based on determining that the first gateway is in the inactive state, configuring the second gateway to operate as a new VRRP leader gateway;

receiving, by the second gateway from a client, network traffic associated with the VRRP IP address; and forwarding, by the second gateway, the network traffic based on the client session information received from the first gateway.

2. The method of claim 1, further comprising:

publishing, by the first gateway when acting as the VRRP leader gateway, information to an access point (AP), the information designating the first gateway as active, and designating the second gateway as standby; and receiving, by the first gateway when acting as the VRRP leader gateway, network traffic directed from the AP to the first gateway based on the published information, wherein the network traffic is from the client and is addressed to the VRRP IP address.

3. The method of claim 2, comprising:

triggering switchover from the first gateway to the second gateway as the new VRRP leader gateway by sending, from the second gateway, a list of active nodes to the AP, wherein the list of active nodes excludes the first gateway; and receiving, by the second gateway when acting as the new VRRP leader gateway, further network traffic directed from the AP to the second gateway based on the published information and the list of active nodes, wherein the further network traffic is from the client and is addressed to the VRRP IP address.

4. The method of claim 3, wherein the list of active nodes excluding the first gateway causes the AP to determine that the first gateway has become inactive.

5. The method of claim 1, wherein an interval between the heartbeat messages is less than an interval between keep-alive messages of the VRRP.

6. The method of claim 1, wherein configuring the second gateway as the new VRRP leader gateway takes less than a second.

7. The method of claim 1, wherein the first gateway comprises a Dynamic Host Configuration Protocol (DHCP) server, the method further comprising:

providing, by the DHCP server in the first gateway, the VRRP IP address to the client.

8. The method of claim 7, wherein the client is coupled to an access point (AP) over a wireless link, and the network traffic from the client is received by the AP over the wireless link.

9. A system comprising:

a cluster comprising a first gateway and a second gateway that employ a Virtual Router Redundancy Protocol (VRRP) and that are implemented on one or more computers, wherein the first gateway is initially a VRRP leader gateway and the second gateway is initially a VRRP standby gateway, and wherein the cluster comprising the first gateway and the second gateway is associated with a VRRP Internet Protocol (IP) address, the second gateway to:

receive, from the first gateway, gateway state information of a gateway state of the first gateway and client session information of client sessions that use the VRRP IP address, thereby synchronizing the gateway state and the client sessions between the first and second gateways, the gateway state comprising authentication information;

receive, at the second gateway from the first gateway, a heartbeat message indicating whether the first gateway is operational, wherein the heartbeat message is distinct from a keep-alive message of the VRRP;

determine, at the second gateway, that the first gateway is in an inactive state based on missing a predetermined number of heartbeat messages from the first gateway;

based on determining that the first gateway is in the inactive state, configure the second gateway to operate as a new VRRP leader gateway;

receive, at the second gateway from a client device, network traffic associated with the VRRP IP address; and forward the network traffic based on the client session information received from the first gateway.

10. The system of claim 9, wherein the first gateway when acting as the VRRP leader gateway is to:

publish information to an access point (AP), the information designating the first gateway as active, and designating the second gateway as standby; and receive, at the first gateway when acting as the VRRP leader gateway, network traffic directed from the AP to the first gateway based on the published information, wherein the network traffic is from the client device and is addressed to the VRRP IP address.

11. The system of claim 10, wherein the second gateway is to:

trigger switchover from the first gateway to the second gateway as the new VRRP leader gateway sending, from the second gateway, a list of active nodes to the AP, wherein the list of active nodes excludes the first gateway; and receive, at the second gateway when acting as the new VRRP leader gateway, further network traffic directed from the AP to the second gateway based on the published information and the list of active nodes, wherein the further network traffic is from the client device and is addressed to the VRRP IP address.

12. The system of claim 9, wherein an interval between the heartbeat messages is less than an interval between keep-alive messages of the VRRP.

13. The system of claim 9, wherein the configuring of the second gateway as the new VRRP leader gateway takes less than a second.

14. The system of claim 9, wherein the first gateway comprises a Dynamic Host Configuration Protocol (DHCP) server to provide the VRRP IP address to the client device, and wherein the client device is coupled to an access point (AP) over a wireless link, and the network traffic from the client device is received by the AP over the wireless link.

15. A non-transitory computer-readable storage medium comprising instructions that when executed cause a system to:

provide a cluster comprising a first gateway and a second gateway that employ a Virtual Router Redundancy Protocol (VRRP), wherein the first gateway is initially a VRRP leader gateway and the second gateway is initially a VRRP standby gateway, and wherein the cluster comprising the first gateway and the second gateway is associated with a VRRP Internet Protocol (IP) address;

receive, at the second gateway from the first gateway, gateway state information of a gateway state of the first gateway and client session information of client sessions that use the VRRP IP address, thereby synchronizing the gateway state and the client sessions between the first and second gateways, the gateway state comprising authentication information;

receive, at the second gateway from the first gateway, a heartbeat message indicating whether the first gateway is operational, wherein the heartbeat message is distinct from a keep-alive message of the VRRP;

determine, at the second gateway, that the first gateway is in an inactive state based on missing a predetermined number of heartbeat messages from the first gateway;

based on determining that the first gateway is in the inactive state, configure the second gateway to operate as a new VRRP leader gateway;

receive, at the second gateway from a client, network traffic associated with the VRRP IP address; and forward, from the second gateway, the network traffic based on the client session information received from the first gateway.

16. The non-transitory computer-readable storage medium of claim 15, wherein the instructions when executed cause the system to:

publish, by the first gateway when acting as the VRRP leader gateway, information to an access point (AP), the information designating the first gateway as active, and designating the second gateway as standby; and receive, at the first gateway when acting as the VRRP leader gateway, network traffic directed from the AP to the first gateway based on the published information, wherein the network traffic is from the client and is addressed to the VRRP IP address.

17. The non-transitory computer-readable storage medium of claim 15, wherein an interval between the heartbeat messages is less than an interval between keep-alive messages of the VRRP.

18. The non-transitory computer-readable storage medium of claim 17, wherein the configuring of the second gateway as the new VRRP leader gateway takes less than a second.

19. The non-transitory computer-readable storage medium of claim 15, wherein the first gateway comprises a Dynamic Host Configuration Protocol (DHCP) server to provide the VRRP IP address to the client.

20. The non-transitory computer-readable storage medium of claim 15, wherein the client sessions comprise a session opened and used by the client.

* * * * *